3,298,835
PROCESS FOR PRODUCTION OF A HOP CONCENTRATE
Robert Peter Hildebrand, Mount Waverley, Victoria, Frank Vincent Harold, Caulfield, Victoria, Brian James Clarke, East Bentleigh, Victoria, and Peter John Andrew Murray, East Malvern, Victoria, Australia, assignors to Carlton and United Breweries Limited, Carlton, Victoria, Australia, a corporation of Victoria
Filed July 27, 1964, Ser. No. 385,310
Claims priority, application Australia, Sept. 3, 1963, 34,921/63
2 Claims. (Cl. 99—50.5)

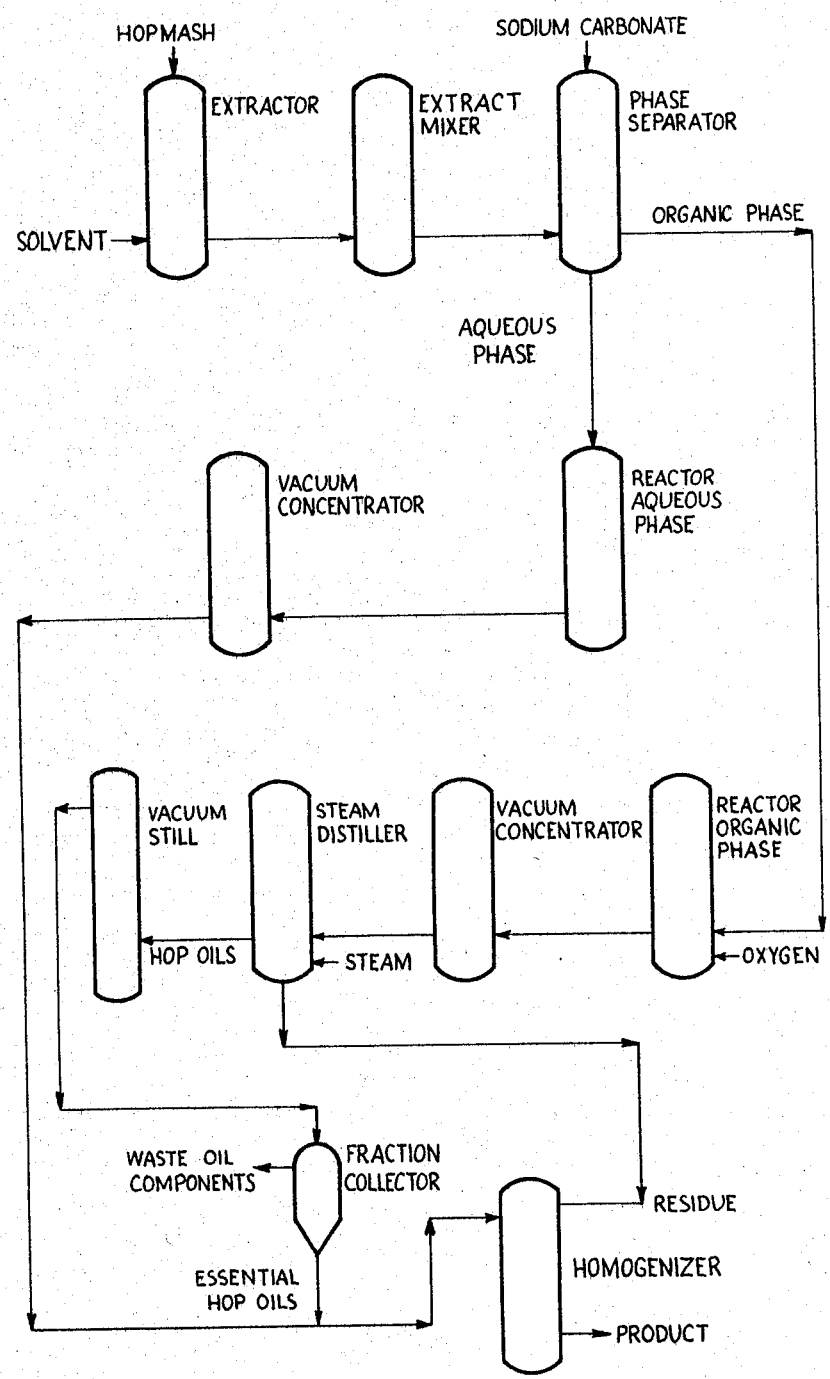

This invention relates to the production of hop concentrates for brewing purposes, particularly for the brewing of beer, and is a continuation-in-part of our co-pending patent application Serial No. 206,000 (now U.S. Patent No. 3,155,522, issued November 3, 1964). More particularly, the invention relates to a process for the production of a hop concentrate wherein the flavour imparting constituents of hops are increased by extracting and then converting inactive constituents to active flavour imparting constituents.

The process of this invention involves the utilization of those constituents which are regarded as relatively "inactive" or which do not normally impart the desired flavour characteristics to brewed beverages and which are not converted to any substantial degree to active flavour-imparting constituents during treatment by existing processes. In the process of our co-pending application the relatively inactive hop constituents of $\alpha$-acids known as humulones are converted to the more "active" iso-humulones by the process of isomerization. It is an object of the present invention to provide an improved process for the production of a hop concentrate for brewing purposes, whereby the lupulones content of the $\beta$-acids of hops may be utilized in addition to the humulone content of the $\alpha$-acids, thereby increasing the flavouring or bittering characteristics of the hop concentrate final product for the production of a brewed beverage.

Accordingly, the invention resides in a process for the production of a hop concentrate for use in the manufacture of a brewed beverage which includes the steps:

(a) Extracting the soluble constituents of hops with an organic solvent and an aqueous solvent, (b) Separating the media formed in step (a) into an organic phase and an aqueous phase, or phases, respectively, (c) Subjecting the organic phase and aqueous phase or phases respectively to treatment whereby inactive constituents of hops, or those constituents not responsible for imparting desired flavour characteristics to brewed beverages, are converted into active constituents, and (d) Concentrating the converted active constituents.

The concentrated converted active constituents may be added (either separately or together) to the wort during the manufacture of a brewed beverage, or to the brewed beverage. The said active constituents may be added at any stage in the manufacture of the beverage, but are preferably added after the wort has been boiled and cooled and before final filtration of the beverage. One of the active constituents may be added at one stage in the manufacture and the other constituent may be added at another stage. In one preferred method, the said active constituents are blended and then added to the wort or beverage, or, alternatively, blending or combining of the said active constituents may be effected in situ in the wort to which said constituents have been added either separately or together. It will be understood that either or both of the said active constituents, and that some or all of each of the said constituents, may be added either to the wort or to the brewed beverage, or both to the wort and to the brewed beverage.

The invention is more fully described with reference to the accompanying drawing which is a diagrammatic representation illustrating an embodiment of the process for preparing a hop concentrate according to the present invention. Referring to the drawing, hop mash is introduced into the solvent extractor, extracted with an organic solvent, preferably trichloroethylene, and the organic hop extract so formed is passed to an extract mixer where a dilute aqueous solution of alkali selected from the group consisting of sodium and potassium hydroxide, carbonates and phosphates is introduced and mixed with the organic hop extract. During the mixing step the constituents of the organic hop extract which are soluble in the aqueous solution are extracted from the hop extract to form an aqueous phase, and the mixture is then separated into aqueous and organic phases respectively.

The aqueous phase is passed to an aqueous phase reactor where heating takes place to isomerize the humulones of the top resins into iso-humulones which are responsible for imparting a more desirable taste and bittering characteristics to beer than the humulones. The excess water is then removed by distillation under vacuum in the vacuum concentrator, and the isomerized concentrate is passed to the homogenizer for blending with the treated product from the separated organic phase. The organic phase is passed to an organic phase reactor and the lupulones of the hop extract are oxidized to hulupones by passing oxygen through the extract. After the oxidation step the trichloroethylene solvent is removed by vacuum distillation in the vacuum concentrator and the concentrated organic phase extract is steam distilled with live steam to remove the total volatile oils from the extract. The residue from the steam distillation is reserved for blending in the homogenizer described hereinafter. The oils removed in the steam distillation step are subjected to fractional distillation under vacuum to collect those components of the hop oils which are regarded as desirable or essential insofar as they impart a desirable flavour or bittering characteristic to beer incorporating a hop concentrate containing the essential oil fraction. The undesirable components comprising a waste fraction are discarded.

The essential hop-oil fraction is blended with a portion of the product from the isomerized aqueous phase and also with the residue from the steam distillation in the homogenizer. The blended product from the homogenizer comprises the hop concentrate final product.

In a preferred form of the process according to the present invention, hop cones, either whole or shredded, are extracted with a solvent which is immiscible with water, either by immersion in a stirred pot at a controlled temperature, or by being subjected to a solvent spray in a centrifuge at a controlled temperature. Alternatively, a combination of the above two techniques may be employed in conjunction with either a batch or a continuous process.

The solvent extract so obtained, together with solvent used for a final hop wash or fresh solvent, as necessary, is used to extract further batches of hops until the extract strength reached is 4% with respect to $\alpha$-acids or any other strength decided upon, generally using a system of hop and solvent movement, which produces an extraction system generally known in the art as a cross-current system in which the fresh hops are always contacted with that solvent richest in hop extract until such time as that extract reaches the required strength.

When this situation is achieved either all or a fraction of the extract is transferred to a mixing device and mixed with one quarter or some other fraction of its volume of aqueous alkali which is selected from the group consisting of sodium and potassium hydroxide, carbonates and phosphates and preferably sodium carbonate solution 0.5%–1.5% by weight with respect to sodium carbonate. The mixture is then separated into two phases by passage through a liquid/liquid separator and the process repeated. In all, the organic phase is extracted with aqueous alkali four times, the relative volume of the two phases being determined by the strength of the alkali and the strength of the extract. Alternatively, what is generally known in the art as a countercurrent system of liquid/liquid extraction may be used in which each freshly introduced quantity of organic phase is contacted by four portions of alkali.

If the countercurrent system is used, control of the pH of the extracting solution in the range 9 to 11 is necessary, but if this is done, either system of liquid/liquid extraction may be so devised so as to yield an alkali solution essentially 1.5% to 0.5% by weight with respect to alkali and 1% with respect to $\alpha$-acid and such that substantially all of the $\alpha$-acid passes from the organic phase to the aqueous phase. At the same time some 10–20% of the lupulones pass into the aqueous phase.

The above process may be carried out continuously by using a countercurrent liquid/liquid contactor of which the Podbielniak unit would be a typical example of a commercially available machine. In this case both the residence time and the alkali strength may be adjusted to achieve essentially the same conditions as are achieved when using the counter-current system of extraction. The pH of the exit aqueous stream is used to control alkali addition to the aqueous feed stream.

When using either extraction system the aqueous phase is then reacted by boiling for between 20 and 30 minutes under an inert atmosphere to produce iso-humulones, either by a batch process or in a continuous reactor, concentrated 1:6 by evaporation under high vacuum in a centrifugal evaporator or any other commercially available evaporator giving a low residence time and finally chilled to 5° C. An alternative process involves acidification of the cold aqueous reaction product to a pH between 1 and 2, wherein the iso-humulones separate out from the aqueous solution as a heavy viscous oil phase which may then be separated from the aqueous phase in a conventional liquid/liquid type separator.

The raffinate (a term which is used in the art to describe the organic phase after removal of the humulones) is passed to a vessel equipped with an agitator and stirred in an atmosphere of oxygen for 24 hours at room temperature, by which time the lupulone material is oxidized to hulupone material and other products. The hulupone materials are bitter and the process of the present invention enables the utilization of the lupulones which under normal conditions do not contribute to the bittering of beer. The raffinate is then concentrated by distillation wherein the solvent is evaporated at atmospheric pressure and finally the appropriate essential hop oil fraction is separated from the concentrated raffinate by fractional distillation under vacuum, substantially as described previously in our above-identified U.S. Patent No. 3,155,522.

An alternative procedure involves the use of gas/liquid gas chromatography, the resulting fractions being blended in the desired proportion.

The concentrated raffinate is washed from the still with hot concentrated sugar solution and blended with the chilled and concentrated aqueous suspension of iso-humulone or its sodium salt obtained by either of the alternate extraction systems previously described together with those desired components of the fractionated hop oil to produce the finished product.

The invention is more fully described with reference to, but is not to be regarded as being limited by, the following example.

EXAMPLE

Hops, 148.75 lbs. were extracted with neutral stabilized trichloroethylene solvent in a cross-current matrix of nine extractions, each three involving approximately 50 lbs. of hops.

The method used was as follows:

The extractor, a commercial laundry machine was charged with approximately 50 lbs. of hops consisting of 21.25 lbs. of Victorian Cluster hops of $\alpha$-acid content 6.53% and 28.50 lbs. of Pride of Ringwood hops of $\alpha$-acid content 10.01%, and flooded with fresh trichloroethylene solvent at room temperature. The hops were extracted, drained free of the solvent, centrifuged and the recovered extract set aside (Run 1.1). The extractor was again flooded with fresh trichloroethylene solvent and the procedure repeated (Run 1.2). The hops were flooded a third time with fresh solvent, extracted, drained, centrifuged as before and the extract recovered (Run 1.3).

The extractor was cleaned and recharged with approximately 50 lbs. of hops consisting of 24.5 lbs. of Victorian Cluster hops of $\alpha$-acid content 6.53% and 23.5 lbs. of Pride of Ringwood hops of $\alpha$-acid content 10.01%, and extracted with the extract recovered from Run 1.1. The extract was recovered by draining and centrifugation as before (Run 2.1). The procedure was repeated and the hops were extracted with the extract recovered from Run 1.2 and the extract recovered and stored (Run 2.2). The hops were then extracted with the extract from 1.3, drained and finally freed of solvent by centrifugation (Run 2.3).

The extractor was recharged with approximately 50 lbs. of hops, consisting of 29 lbs. of Victorian Cluster hops of $\alpha$-acid content 6.55% and 22 lbs. of Pride of Ringwod hops of $\alpha$-acid content 10.01%, and the fresh hops extracted with the extract from Run 2.1. This was termed Run 3.1. This extraction was followed by a second using the extract from Run 2.2, and the run coded 3.2. Finally the hops were extracted with the extract from Run 2.3 and this run was coded 3.3. The results are tabulated below.

|  | Pounds |
|---|---|
| Total wt. $\alpha$-acid charged to extractor | 12.28 |
| Total wt. $\beta$-acid charged to extractor | 15.71 |
| Total wt. $\alpha$-acid recovered from extractor | 11.85 |
| Total wt. $\beta$-acid recovered from extractor | 15.70 |

The recovered products were distributed as indicated below:

|  | Total | Run 3.1 | Run 3.2 | Run 3.3 |
|---|---|---|---|---|
| $\alpha$-acid, lbs | 11.85 | 8.25 | 2.69 | 0.91 |
| $\beta$-acid, lbs | 15.70 | 12.03 | 3.01 | 0.66 |
| Total wt. extract solution, lbs | 1,376 | 459 | 475 | 442 |

Forty litres of hop extract containing approximately 3.42 lbs. of $\alpha$-acid from Run 3.1 was diluted with 20 litres of trichloroethylene and mixed with 30 litres of aqueous 0.5% sodium carbonate solution. The resulting emulsion was separated by centrifugation through a continuous discharge hermetically sealed centrifuge. The process was repeated five times using in this case, fresh carbonate at each stage, to give aqueous extracts of pH 8.6, 9.0, 9.8, 10.1 and 10.45 respectively representing a 100% recovery.

The aqueous extracts were combined and diluted with a further 30 litres of 0.2 N sodium carbonate and boiled for 30 minutes to convert the $\alpha$-acid to iso $\alpha$-acid.

The aqueous solution was then adjusted with acid to a pH between 1 and 2 and after standing for 10 minutes, passed through a hermetically sealed centrifuge and the heavy organic phase consisting basically of isohumulones together with 5% of the aqueous phase, was recovered.

Analysis of the organic phase indicated that it consisted of 85% by weight isohumulones, approximately 8% by weight lupulones and 7% by weight of unidentified materials. Overall the recovery of isohumulone was 98%.

The raffinate containing 78.2% by weight of the total β-acid charged to the extractor, was passed to a cylindrical agitated vessel with facilities for efficient dispersal of gaseous oxygen and stirred for 24 hours in an atmosphere of oxygen maintained at a pressure of 1.5 lbs. per square inch above atmospheric pressure. The trichloroethylene solution took up 290 litres of oxygen and yielded hulupones or similar bitter materials in 38.7% yield by weight based on the β-acid content in the raffinate.

The raffinate was concentrated and the solvent removed by distillation at atmospheric pressure under a four plate distillation column. The essential hop oils containing a small amount of residual trichloroethylene were removed by vacuum steam distillation at 45–50° C. and at a pressure of 100 mm. of mercury. Thus yielding 0.4 lb. of essential hop oil together with 0.2 lb. of trichloroethylene. The remaining trichloroethylene was removed by distillation at atmospheric pressure through a four plate fractionating column. The column was evacuated and the essential hop oil fractionated into three fractions at 10 mm. of mercury pressure as below:

|  | Lbs. |
|---|---|
| Fraction 1, boiling point 52–53° C. | 0.20 |
| Fraction 2, boiling point 53–110° C. | 0.05 |
| Fraction 3, boiling point 110–140° C. | 0.12 |
| Pot residue | 0.03 |

20% of Fraction 1, 25% of Fraction 2 was blended with 80% of Fraction 3 and were combined with the pot residue.

The recovered isohumulones together with the concentrated raffinate left after the removal of trichloroethylene and hop oils were emulsified together with the above blended essential hop oil fractions and a quantity of sugar. The above concentrate was added to cold unhopped wort of such a quantity to give an isohumulone content in the wort of 30 p.p.m. This was fermented and processed in the conventional manner.

We claim:
1. A process for the production from hops of a hop concentrate for use in the manufacture of a brewed beverage which includes the steps:
    (a) extracting hops with a water-immiscible organic solvent selected from the group consisting of aromatic hydrocarbons, low boiling petroleum solvents and chlorinated aliphatic hydrocarbons to obtain an organic hops extract solution;
    (b) extracting alkali-soluble constituents from the hops extract solution obtained from step (a) with an aqueous solution of an alkaline substance selected from the group consisting of sodium hydroxide, potassium hydroxide, sodium carbonate and potassium carbonate;
    (c) separating the extract solutions obtained from steps (a) and (b) into an organic phase and an aqueous phase, respectively;
    (d) heating the separated aqueous phase to convert humulones of the α-acids of hops into iso-humulones;
    (e) oxidizing lupulones and lupulone-like substances of the β-acids of hops in the separated organic phase into hulupones and hulupone-like substances by passing a free oxygen-containing gas through the organic phase solution;
    (f) concentrating the aqueous phase solution and the organic phase solution respectively, by distilling off water and solvent under reduced pressure while continuing distillation of the organic phase to remove from the hop-oils low boiling esters with undesirable taste characteristics, and
    (g) recovering concentrated extracts from both phases for subsequent addition to wort.

2. A process for the production from hops of a hop concentrate for use in the manufacture of a brewed beverage which includes the steps:
    (a) extracting the hops with trichloroethylene;
    (b) extracting the alkali-soluble constituents from the organic extract obtained from step (a) with an aqueous solution of an alkaline substance selected from the group consisting of sodium hydroxide, potassium hydroxide, sodium carbonate and potassium carbonate, the quantity of alkaline solution being sufficient to remove substantially all of the humulones of the α-acids content from the organic extract;
    (c) separating the extracts from step (a) and step (b) into an organic phase and an aqueous phase, respectively;
    (d) boiling the separated aqueous alkaline phase in an inert atmosphere to convert humulones into iso-humulones;
    (e) oxidizing the separated organic phase by passing oxygen therethrough to oxidize the lupulones of β-acids to hulupones thereby increasing the yield of bittering substances in the extract;
    (f) evaporating solvent and low-boiling-hop-oil esters of undesirable taste characteristics from the oxidized organic phase, and water from the aqueous phase by distillation, to form a concentrated organic phase containing essential sesquiterpenoid components of hop-oils and hulupones and a concentrated aqueous phase containing iso-humulones, respectively; and recovering concentrated extracts from both phases for subsequent addition to wort.

References Cited by the Examiner

UNITED STATES PATENTS

| 2,652,333 | 9/1953 | Nilsson et al. | 99—50.5 |
| 2,894,841 | 7/1959 | Compton et al. | 99—52 |
| 2,898,209 | 8/1959 | Murtaugh et al. | 99—50.5 |
| 3,143,425 | 8/1964 | Mueller | 99—50.5 |

A. LOUIS MONACELL, *Primary Examiner.*

D. M. STEPHENS, *Assistant Examiner.*